US011727331B2

(12) United States Patent
Dake et al.

(10) Patent No.: US 11,727,331 B2
(45) Date of Patent: Aug. 15, 2023

(54) SYSTEMS AND METHODS FOR INTELLIGENT TICKET MANAGEMENT AND RESOLUTION

(71) Applicant: FIDELITY INFORMATION SERVICES, LLC, Jacksonville, FL (US)

(72) Inventors: Joel E. Dake, Hubertus, WI (US); Damyn L. Gessler, Madison, WI (US); Shane M Patzlsberger, Wauwatosa, WI (US); Shane W. Strunk, St. Petersburg, FL (US); Benjamin Wellmann, Boca Raton, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 2 days.

(21) Appl. No.: 17/140,812

(22) Filed: Jan. 4, 2021

(65) Prior Publication Data

US 2022/0215323 A1 Jul. 7, 2022

(51) Int. Cl.
*G06Q 10/00* (2023.01)
*G06Q 10/0631* (2023.01)
(Continued)

(52) U.S. Cl.
CPC ..... *G06Q 10/063114* (2013.01); *G06F 9/451* (2018.02); *G06F 40/40* (2020.01); *G06N 20/00* (2019.01)

(58) Field of Classification Search
CPC .......... G06Q 10/063; G06Q 10/063114; G06F 40/40; G06F 40/20; G06F 40/10; G06F 40/00

See application file for complete search history.

(56) References Cited

U.S. PATENT DOCUMENTS

2017/0372231 A1* 12/2017 Ghatage ................ G06F 40/58
2018/0032971 A1    2/2018 Karuppasamy et al.
(Continued)

FOREIGN PATENT DOCUMENTS

WO    WO-2019214799 A1 * 11/2019 ......... B60R 16/0373

OTHER PUBLICATIONS

Ferland, N., Sun, W., Fan, X., Yu, L., & Yang, J. (2020). Automatically resolve trouble tickets with hybrid NLP. 2020 IEEE Symposium Series on Computational Intelligence (SSCI), 1334-1340. (Year: 2020).*

(Continued)

*Primary Examiner* — William S Brockington, III
(74) *Attorney, Agent, or Firm* — Finnegan, Henderson, Farabow, Garrett & Dunner LLP

(57) ABSTRACT

Some aspects of the present disclosure are directed to computer-implemented systems and methods for efficient ticket resolution. The methods may include: receiving a request to resolve an issue; analyzing, via natural language processing, the language in the request to determine the issue to be resolved; determining whether the issue meets a condition for automated resolution; if the condition is met: extracting, via an application programming interface and from the at least one user device, information needed to resolve the issue; and resolving the issue using the extracted information; and if the condition is not met: generating a ticket; assigning a work group to the ticket; determining whether a job aid associated with the issue exists; and forwarding at least one of: the job aid; received communications from the work group; and an estimated amount of time to resolution.

20 Claims, 5 Drawing Sheets

(51) Int. Cl.
*G06F 40/40* (2020.01)
*G06F 9/451* (2018.01)
*G06N 20/00* (2019.01)

(56) References Cited

U.S. PATENT DOCUMENTS

| | | | |
|---|---|---|---|
| 2018/0150555 A1* | 5/2018 | Karuppasamy | G06Q 10/20 |
| 2018/0285768 A1 | 10/2018 | Karuppasamy | |
| 2019/0037077 A1* | 1/2019 | Konig | H04M 3/527 |
| 2019/0347282 A1 | 11/2019 | Cai et al. | |
| 2020/0204431 A1* | 6/2020 | Bahrami | G06F 16/355 |
| 2020/0349529 A1* | 11/2020 | Wang | G06F 40/284 |
| 2020/0372367 A1* | 11/2020 | Ha | G06F 40/20 |
| 2021/0097551 A1* | 4/2021 | Tzur | G06Q 30/016 |

OTHER PUBLICATIONS

Shao, Q., Chen, Y., Tao, S., Yan, X., & Anerousis, N. (2008). EasyTicket: A Ticket Routing Recommendation Engine for Enterprise Problem Resolution. Proceedings of the VLDB Endowment, 1(2), 1436-1439. (Year: 2008).*

Shao, Q. et al. EasyTicket: A Ticket Routing Recommendation Engine for Enterprise Problem Resolution. Proceedings of the VLDB Endowment, 1(2), pp. 1436-1439, Oct. 22, 2008 (4 pages).

Search Report and Written Opinion of the International Searching Authority in counterpart International Application No. PCT/US/2022/011180, mailed Apr. 21, 2022 (15 pages).

* cited by examiner

SYSTEMS AND METHODS FOR INTELLIGENT TICKET MANAGEMENT AND RESOLUTION

TECHNICAL FIELD

The present disclosure generally relates to computerized methods and systems for intelligent ticket management and resolution and, more particularly, to computerized methods and systems for automatically assessing the resolvability and characteristics of an issue based on user-provided issue descriptions and efficiently providing solutions to the user based on the assessment.

BACKGROUND

Many service providers (e.g., financial service providers) provide computerized products and services (e.g., banking applications and services) to customers. In some cases, a customer may run into issues with a product or service and may be required to consult with the service provider in order to resolve the issue. In many cases, customers open support cases (i.e., "tickets") with the service provider by contacting them, for example, via phone or via a web-based application. In conventional systems, the service provider will require certain information about the customer's issue that enable the ticket to be addressed by an appropriate work group or team associated with the service provider. This information can be acquired, for example, through electronic or telephonic communications, where the service provider prompts the customer to provide the information.

This initial exchange of information to determine the specific issue identified by the customer and identifying appropriate work groups typically requires a large amount of manual assessment by the service provider, which will need to expend electronic resources and labor hours in addressing the customer's issues. In many cases, the service provider will provide service and product manuals and other job aids (e.g., Frequently Asked Questions) that are accessible through a website in order to mitigate these issues. Customers, however, often find it difficult to navigate through these resources to find the correct job aid and are more likely to open a ticket with the service provider than consult these resources, even though the solution may have been accessible through an available job aid.

Therefore, there is a need for systems and methods that enable autonomous computer systems to efficiently resolve service and product related customer issues by intelligently evaluating user-provided issue descriptions and directing customers to appropriate work groups and/or job aides.

SUMMARY

One aspect of the present disclosure is directed to a computer-implemented system for efficient ticket resolution. The system may include: a memory storing instructions; and at least one processor configured to execute the instructions to perform operations including: receiving, from at least one user device, a request to resolve an issue, the request comprising language; analyzing, via natural language processing, the language in the request to determine the issue to be resolved; based on the analysis, determining whether the issue meets a condition for automated resolution; if the condition is met: extracting, via an application programming interface and from the at least one user device, information needed to resolve the issue; and resolving the issue using the extracted information; and if the condition is not met: inserting, into at least one database, a ticket comprising: an identifier associated with the at least one user device; and information associated with the issue to be resolved; assigning, based on the information, a work group to the ticket; consulting the at least one database to determine whether a job aid associated with the issue exists; forwarding, to the at least one user device, at least one of: the job aid; received communications from the work group; and an estimated amount of time to resolution based on the information.

Another aspect of the present disclosure is directed to a computer-implemented method for efficient ticket resolution. The method may include: receiving, from at least one user device, a request to resolve an issue, the request comprising language; analyzing, via natural language processing, the language in the request to determine the issue to be resolved; based on the analysis, determining whether the issue meets a condition for automated resolution; if the condition is met: extracting, via an application programming interface and from the at least one user device, information needed to resolve the issue; and resolving the issue using the extracted information; and if the condition is not met: inserting, into at least one database, a ticket comprising: an identifier associated with the at least one user device; and information associated with the issue to be resolved; assigning, based on the information, a work group to the ticket; consulting the at least one database to determine whether a job aid associated with the issue exists; forwarding, to the at least one user device, at least one of: the job aid; received communications from the work group; and an estimated amount of time to resolution based on the information.

Other systems, methods, and computer-readable media are also discussed herein.

DETAILED DESCRIPTION

Figure 1:
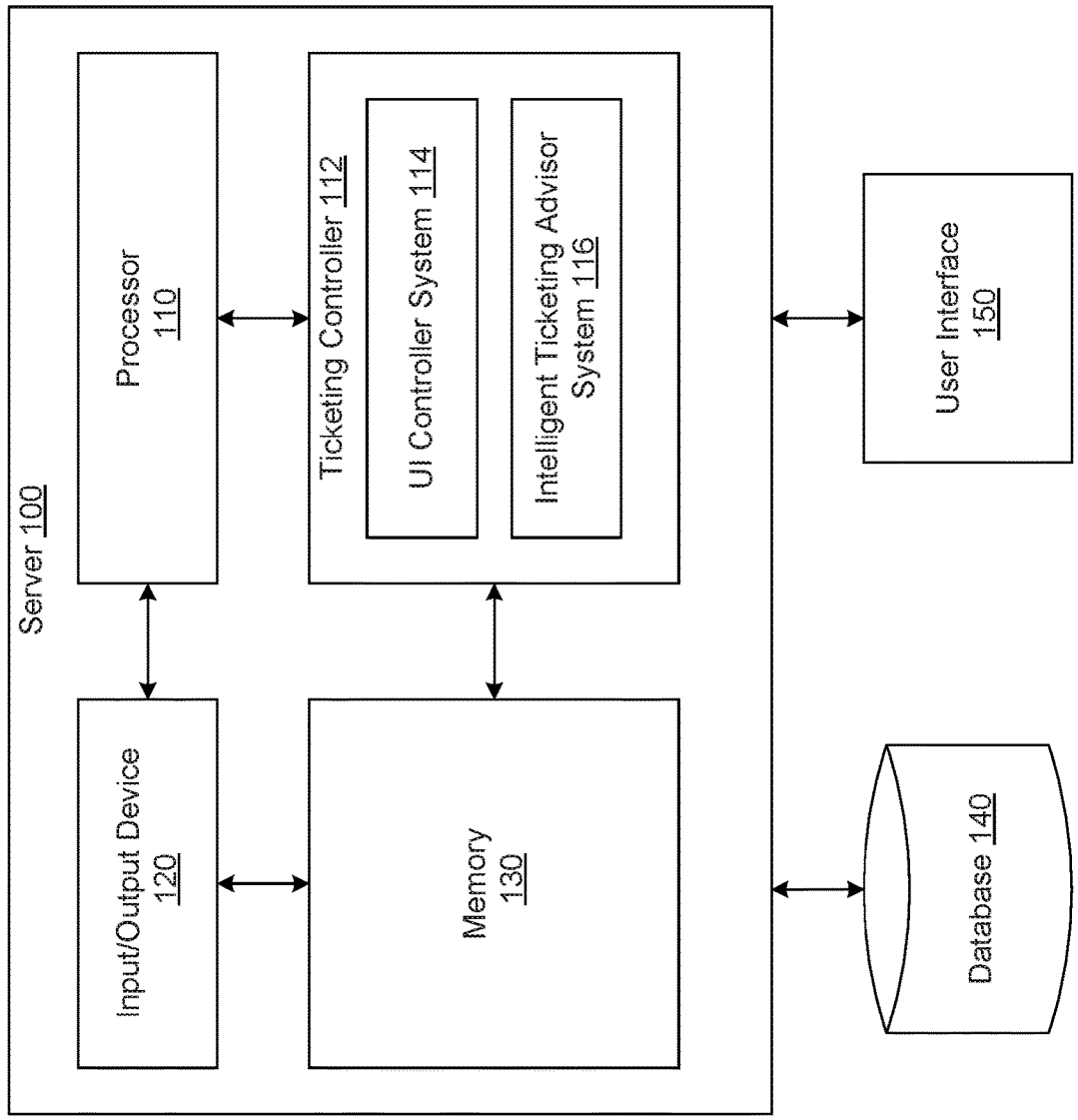
FIG. 1 is a diagram of an example server computer system for intelligent ticket management and resolution, consistent with embodiments of this disclosure.

The disclosed embodiments include systems and methods for intelligent ticket management and resolution. Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways.

As such, those skilled in the art will appreciate that the conception upon which this disclosure is based may readily be utilized as a basis for designing other structures, methods, and systems for carrying out the several purposes of the present disclosure.

Reference will now be made in detail to the present example embodiments of the disclosure, examples of which are illustrated in the accompanying drawings. Wherever possible, the same reference numbers will be used throughout the drawings to refer to the same or like parts.

FIG. 1 is a block diagram of an example server computer system 100 (referred to as "server 100" hereinafter), consistent with some embodiments of this disclosure. Server 100 may be one or more computing devices configured to execute software instructions stored in memory to perform one or more processes consistent with some embodiments of this disclosure. For example, server 100 may include one or more memory devices for storing data and software instructions and one or more hardware processors to analyze the data and execute the software instructions to perform server-based functions and operations (e.g., back-end processes). The server-based functions and operations may include intelligent ticket management and resolution.

In FIG. 1, server 100 includes a hardware processor 110, an input/output (I/O) device 120, and a memory 130. It should be noted that server 100 may include any number of those components and may further include any number of any other components. Server 100 may be standalone, or it may be part of a subsystem, which may be part of a larger system. For example, server 100 may represent distributed servers that are remotely located and communicate over a network.

Processor 110 may include or one or more known processing devices, such as, for example, a microprocessor. In some embodiments, processor 110 may include any type of single or multi-core processor, mobile device microcontroller, central processing unit, or any circuitry that performs logic operations. In operation, processor 110 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in memory 130, processor 110, or elsewhere.

I/O device 120 may be one or more devices configured to allow data to be received and/or transmitted by server 100. I/O device 120 may include one or more customer I/O devices and/or components, such as those associated with a keyboard, mouse, touchscreen, display, or any device for inputting or outputting data. I/O device 120 may also include one or more digital and/or analog communication devices that allow server 100 to communicate with other machines and devices, such as other components of server 100. I/O device 120 may also include interface hardware configured to receive input information and/or display or otherwise provide output information. For example, I/O device 120 may include a monitor configured to display a customer interface.

Memory 130 may include one or more storage devices configured to store instructions used by processor 110 to perform functions related to disclosed embodiments. For example, memory 130 may be configured with one or more software instructions associated with programs and/or data.

Memory 130 may include a single program that performs the functions of the server 100, or multiple programs. Additionally, processor 110 may execute one or more programs located remotely from server 100. Memory 130 may also store data that may reflect any type of information in any format that the system may use to perform operations consistent with disclosed embodiments. Memory 130 may be a volatile or non-volatile (e.g., ROM, RAM, PROM, EPROM, EEPROM, flash memory, etc.), magnetic, semiconductor, tape, optical, removable, non-removable, or another type of storage device or tangible (i.e., non-transitory) computer-readable medium.

Consistent with some embodiments of this disclosure, server 100 includes ticketing controller system 112 that may include a UI controller system 114 and an intelligent ticketing advisor system 116. Ticketing controller may be configured to autonomously and automatically implement intelligent ticket management and resolution using UI controller system 114 and intelligent ticketing assessor 116. Ticketing controller 112 may be implemented as software (e.g., program codes stored in memory 130), hardware (e.g., a specialized chip incorporated in or in communication with processor 110), or a combination of both. UI controller system 114 may be configured to react to various user-initiated events (e.g., an input received from user interface 150). Intelligent ticketing advisor 116 may be configured to evaluate user-provided descriptions, for example, using natural language processing (NLP) and artificial intelligence (AI).

Server 100 may also be communicatively connected to one or more databases 140. For example, server 100 may be communicatively connected to database 140. Database 140 may be a database implemented in a computer system (e.g., a database server computer). Database 140 may include one or more memory devices that store information (e.g., the data outputted by ticketing controller system 112) and are accessed and/or managed through server 100. By way of example, database 140 may include Oracle™ databases, Sybase™ databases, or other relational databases or non-relational databases, such as Hadoop sequence files, HBase, or Cassandra. Systems and methods of disclosed embodiments, however, are not limited to separate databases. In one aspect, server 100 may include database 140. Alternatively, database 140 may be located remotely from the server 100. Database 140 may include computing components (e.g., database management system, database server, etc.) configured to receive and process requests for data stored in memory devices of database 140 and to provide data from database 140.

Server 100 may also be communicatively connected to at least one user interface 150. User interface 150 may include a graphical interface (e.g., a display panel), an audio interface (e.g., a speaker), or a haptic interface (e.g., a vibration motor). For example, the display panel may include a liquid crystal display (LCD), a light-emitting diode (LED), a plasma display, a projection, or any other type of display. The audio interface may include microphones, speakers, and/or audio input/outputs (e.g., headphone jacks). In some embodiments, user interface 150 may be included in server 100. In some embodiments, user interface 150 may be included in a separate computer system. User interface 150 may be configured to display data transmitted from server 100.

In connection with server 100 as shown and described in FIG. 1, the systems and methods as described herein may provide a technical solution to technical problems in automated ticket management and resolution. Aspects of this disclosure may relate to autonomous testing of a computer application, including systems, apparatuses, methods, and non-transitory computer-readable media. For ease of description, a system is described below, with the understanding that aspects to the system apply equally to methods, apparatuses, and non-transitory computer-readable media. For example, some aspects of such a system can be implemented by a system (e.g., server 100 and database 140), by an apparatus (e.g., server 100), as a method, or as program codes or computer instructions stored in a non-transitory computer-readable medium (e.g., memory 130 or another storage device of server 100). In a broadest sense, the system is not limited to any particular physical or electronic instrumentalities, but rather can be accomplished using many different instrumentalities.

Consistent with some embodiments of this disclosure, a system for intelligent ticket management and resolution may include a non-transitory computer-readable medium configured to store instructions and at least one processor configured to execute the instructions to perform operations. A computer application, as used herein, may refer to a set of computer programs or modules combined in a logical manner to implement a function (e.g., a financial service). In some embodiments, the computer application may be created, maintained, updated, or executed at a server computer of the system. In some cases, because the function may be implemented by multiple, different sequences of operations the computer application may be implemented by multiple, different programs.

By way of example, with reference to FIG. 1, the system may include server 100 and database 140. The at least one processor may be processor 110 in server 100. The non-transitory computer-readable medium may be memory 130 in server 100. The instructions stored in the non-transitory computer-readable medium may be used for implementing testing module 111 in server 100.

Figure 2:
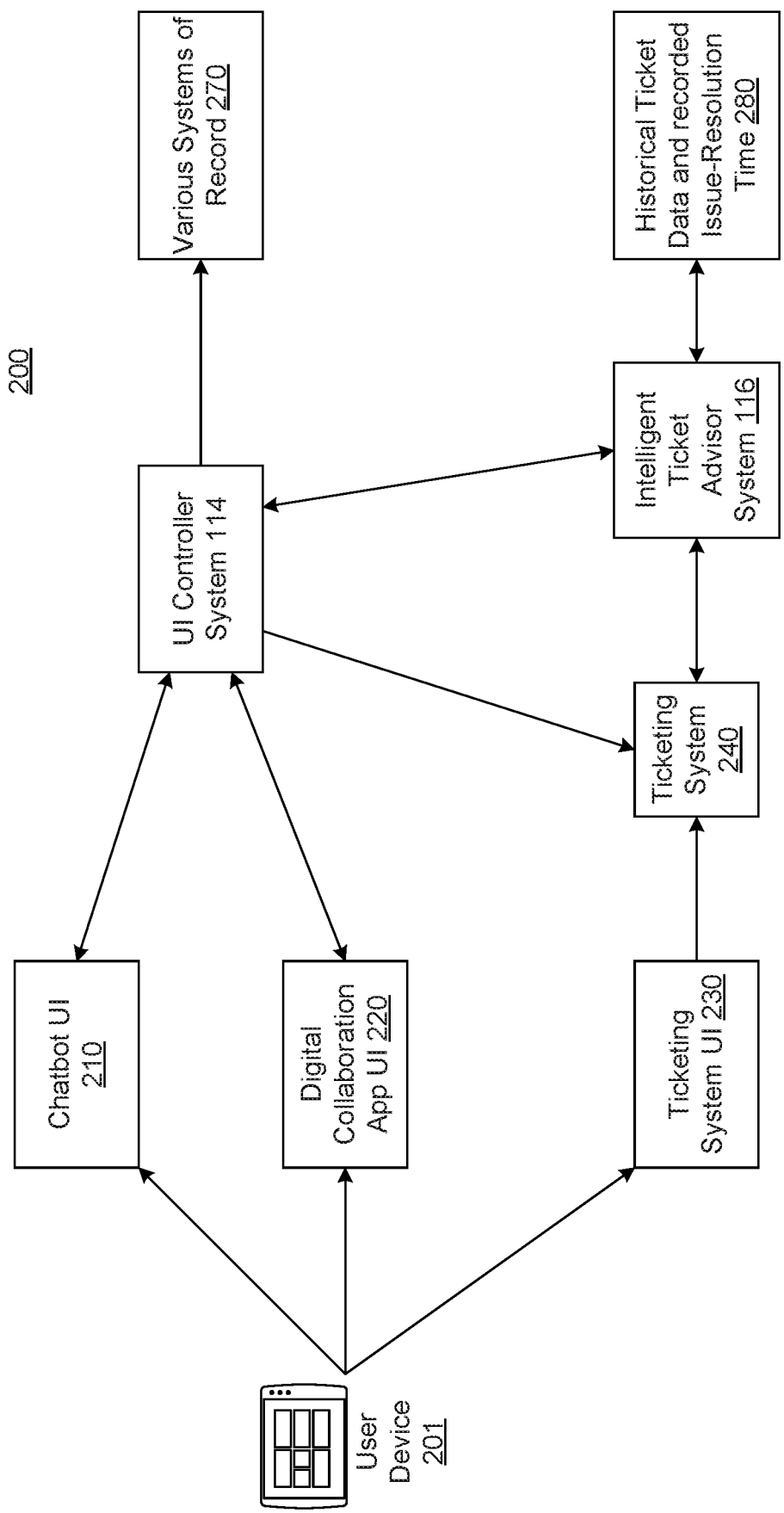
FIG. 2 is a diagram of an example structure of a system for intelligent ticket management and resolution, consistent with embodiments of this disclosure.

FIG. 2 is a diagram of an example structure of a system 200 for intelligent ticket management and resolution, consistent with some embodiments of this disclosure. By way of example a user (e.g., a customer) associated with user device 201 (e.g., a computer, tablet, cellular phone, etc.) may experience issues with a product or service associated with a service provider (e.g., financial services) that implements the systems and methods disclosed herein to resolve customer issues. In some embodiments, user device 201 may be associated with a customer that initiates a support case by providing, via a network, a text or voice description of their issue to chatbot UI 210, digital collaboration app UI 220, ticketing system UI 230, or any other suitable method of communicating with the service provider and may be required to consult with the service provider in order to resolve the issue. In some embodiments, however, user device 201 may be associated with an employee or agent associated with the service provider that is acting on behalf of a customer to help resolve their issue. For example, a customer may be in communication with a user associated with user device 201, and user device 201 may provide updates to ticketing system UI 230 based on the communications.

In some embodiments, chatbot UI 210 may include a software or web-based application that may be used to conduct an online chat conversation with user device 201 via text or text to speech, and may be configured to simulate the way a human would act as a conversational partner. Digital collaboration app UI 220 may include a software or web-based application (e.g., Slack, Microsoft Teams, Google Drive, etc.) that offers services such as instant messaging, file sharing, teleconferencing, and/or video conferencing, or any other application that enables user device 201 to interact with one or more individuals associated with the service provider. Digital collaboration app UI may also be configured to view and update ticket information through UI controller system 114. Chatbot UI 210 and digital collaboration app UI may be configured to exchange information, such as user-provided descriptions and/or language and system responses, between user device 201 and UI controller system 114. Ticketing system UI 230 may be any software or web-based application that user device 201 may use to update or modify information relating to their ticket status (e.g., not resolved, resolved, estimated resolution time, etc.). Ticketing system UI 230 may be communicatively coupled to ticketing system 240 (e.g., via a network).

In some embodiments, UI controller system 114 may be configured to react to various user-initiated events through chatbot UI 210 and digital collaboration app UI 220. For example, UI controller system 114 may conduct a dialogue with user device 201 and communicate with ticketing system 240, intelligent ticketing advisor system ("ITA") 116, and/or various systems of record 270 in order to identify issues, create, view, and update tickets, and to resolve issues in real-time. These various systems of record may include systems responsible for storing and managing client data. For example, these systems may often need to be updated to correct data entry errors, or update configuration to enable additional system capabilities to be implemented. Examples of such systems include those responsible for maintaining client's customer's account data, and/or client-user ids, passwords, and permissions granted to users. Chatbot UI, digital collaboration app UI 220, ticketing system UI 230, ticketing system 240, UI controller system 114, intelligent ticket advisor system 116, various systems of record 270, and/or any other system, subsystem, or component associated with system 200 may be implemented on a single system and/or server or as multiple systems interconnected via a network.

In some embodiments, ITA 116 may be configured using natural language processing (NLP) technology, and may be configured to perform various tasks, such as text and speech processing, morphological analysis, syntactic analysis, lexical and rational semantics, discourse, or any other form of analysis of natural language data. ITA 116 may also utilize dialogue management, natural language generation, or any other suitable means of generating natural language responses or automatically answering questions based on user-provided information.

In some embodiments, ITA 116 may be configured to evaluate a user-provided description of an issue received from chatbot UI 210, digital collaboration app UI, and/or ticketing system UI 230 (FIG. 2). Based on the evaluation, ITA 116 may identify the issue and generate an assessment of how the issue can be most efficiently resolved. ITA 116 may continuously evaluate the ticket and update the assessment or may generate a new assessment upon receiving additional information from UI controller system 114 (e.g., additional user-provided descriptions) or from ticketing system 240 (e.g., ticket status updates). In some embodiments, the assessment may include an identification of the issue, a determination of whether the issue is immediately resolvable or can be resolved in real time, whether additional information is needed, and/or an estimated resolution time. ITA 116 may store historical ticket data and recorded issue-resolution time 280 (FIG. 2) in at least one database (e.g., database 140 in FIG. 1), which may be used, for example, to train one or more machine-learning algorithms utilized by ITA 116 (e.g., support vector machines, Bayesian networks, maximum entropy, conditional random field, random forest, gradient boosting, neural networks, etc.). In some embodiments, ITA 116 may be configured to access the at least one database to determine whether there is a job aid (e.g., product and/or service manuals, FAQs, troubleshooting guides, etc.) corresponding to the identified issues, and may provide user device 201, for example via chatbot UI 210 and/or digital collaboration app UI 220, the job aid and/or excerpt of the job aid corresponding to the issue (e.g., by sending a file or a hyperlink).

Figure 3:
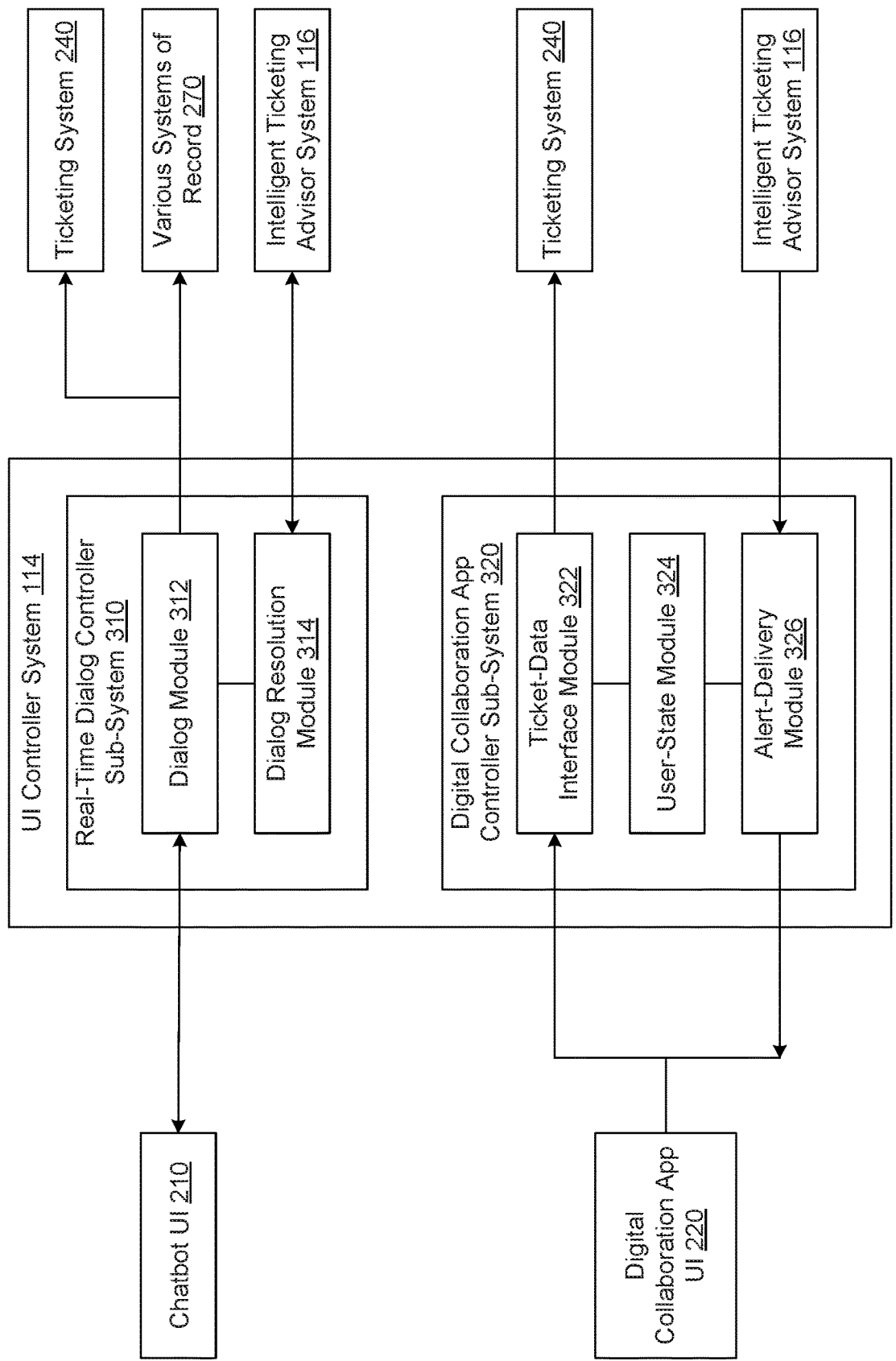
FIG. 3 is a diagram of an example structure of an UI controller system for intelligent ticket management and resolution, consistent with embodiments of this disclosure.

FIG. 3 is a diagram of an example structure of UI controller system 114 for intelligent ticket management and resolution, consistent with some embodiments of this disclosure. UI controller system 114 may include real-time dialog controller sub-system 310, which may include dialog module 312 and dialog resolution module 314. It is to be understood that the configuration of elements depicted in FIG. 3 is exemplary only, and that disclosed embodiments are not limited to any particular programming or arrangement of modules, devices, and/or systems.

Dialog module 312 may be configured to receive user-defined issue descriptions as free-form text from chatbot UI 210 and send responses to chatbot UI 210. Dialog module 312 may also be communicatively coupled with ticketing system 240 and various systems of record 270, for example, via an application-programming interface (API).

Dialog resolution module 314 may be configured to send the user-defined issue description received by dialog module 312 to ITA 116, which may return an assessment to dialog resolution module 314.

In some embodiments, UI controller system may also include digital collaboration app controller sub-system 320, which may include ticket-data module 322, user-state module 324, and alert-delivery module 326.

Ticket interface module may be configured to retrieve a job aid from digital collaboration app UI 220 and forward ticket-related information (e.g., an identified issue in the ticket, an assigned work group, associated job aids, estimated time to resolution, communications from the user and the work group, etc.) to user-state module 324 and ticketing system 240.

User-state module 324 may be configured to receive information from ticket-data module 322 and alert-delivery module and may maintain, monitor, and/or update ticket information based on the received information. User-state module 324 may be responsible for relating user identity within the digital collaboration application itself, to the same user's identity within the ticketing system. When an alert is generated based on a ticket-update, for example, user-state module 324 may enable the alert to be delivered to the digital collaboration instance associated with that user.

Alert-delivery module 326 may be configured to send alerts to digital collaboration app UI 220 based on information received from user-state module 324 or intelligent ticketing advisor system 116. Alerts may include any notification relating to a status of a ticket. For example, alert-delivery module 326 may be configured to send digital collaboration app UI 220 an alert indicating that the ticket has been resolved, that a work group has been assigned to the ticket, that an estimated time to resolution has been updated, that an additional issue has been identified, and/or that a suitable job aid has been found.

Figure 4:
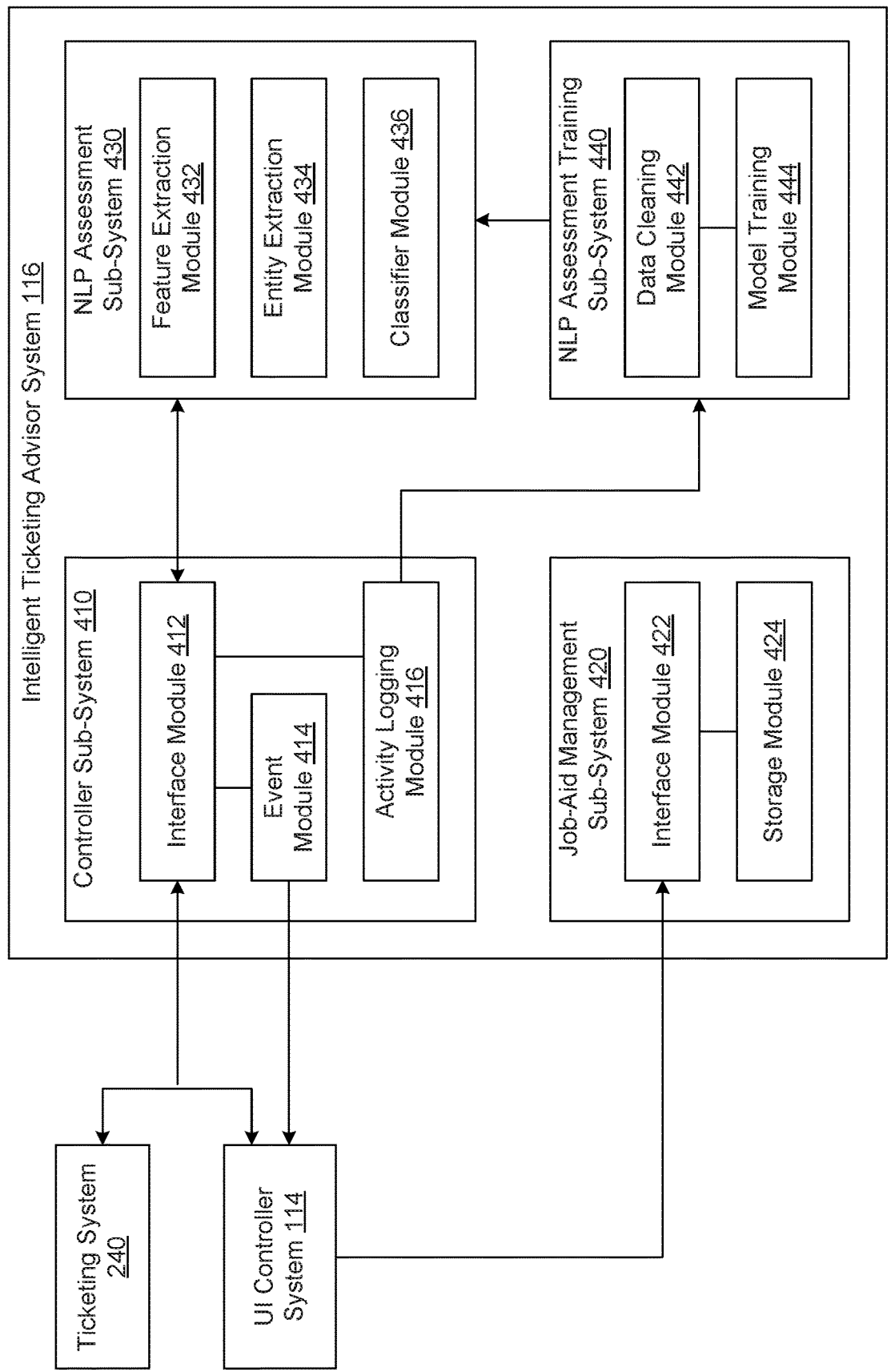
FIG. 4 is a diagram of an example structure of an intelligent ticketing advisor system for intelligent ticket management and resolution, consistent with embodiments of this disclosure.

FIG. 4 is a diagram of an example structure of ITA 116 for intelligent ticket management and resolution, consistent with some embodiments of this disclosure. ITA 116 may include controller sub-system 410, job aid management system 420, NLP assessment sub-system 430, and NLP assessment training sub-system, and may be configured to send and receive job aid information from job aid management sub-system 420. Controller sub-system 410 may include interface module 412, event module 414, and activity logging module 416. It is to be understood that the configuration of elements depicted in FIG. 4 is exemplary only, and that disclosed embodiments are not limited to any particular programming or arrangement of modules, devices, and/or systems.

Interface module 412 may be configured to exchange user-defined issue descriptions, new ticket data, and description assessments between ticketing system 240, UI controller system 114, event module 414, activity logging module 416, and NLP assessment sub-system 430. For example, interface module 412 may be configured to forward updated ticket data received from NLP assessment sub-system 430 to ticketing system 240.

Event module 414 may be configured to monitor the exchange of data through interface module 412 and forward event messages to UI controller system 114, such as an alert regarding the status of a ticket. In some embodiments, the alerts may be interactive in form. For example, event module 414 may be configured to prompt a user to submit additional information that may be added to a given ticket stored and/or monitored by ticketing system 240.

Activity logging module 416 may collect data from interface module to NLP assessment training sub-system 440 to be used as training data to improve NLP operations of ITA 116. In some embodiments, activity logging module 416 may be configured to capture user-activity occurring via UI controller system 114. This activity includes, for example, user-choices relative to suitability of a job aid to satisfying user needs. These activity data may be fed to the NLP assessment training sub-system 440 in order to enable more effective future recommendations to be made by NLP assessment sub-system 430 through incremental NLP model training. In some embodiments, job aid management sub-system 420 may include interface module 422 and storage module 424, and may be configured to maintain a record of job aids and facilitate the access, insertion, deletion, and/or modification of job aid or job aid-related information. Storage module 424 may be a memory, a database, or any other form of data storage that may store any number of job aids. Interface module 422 may be configured to access storage module 424 to determine whether a job aid for a certain issue, retrieve the job aid, and transmit the job aid to UI controller system 114. For example, NLP assessment system may evaluate a user-defined issue description and return an assessment including an identified issue to UI controller system 114 through interface module 412. UI controller system 114 may forward the identified issue to interface module 422, which may determine whether a job aid corresponding to the identified issue exists.

In some embodiments, NLP assessment sub-system 430 may include feature extraction module 432, entity extraction module 434, and classifier module 436. Feature extraction module 432 may be configured to filter or pre-process the information contained in the user-defined issue description into identifiable individual properties or characteristics, such as a combination of one or more words or characters. Feature extraction module 432 may be configured to perform a variety of complex data analysis techniques, such as text transformation, vectorization, independent component analysis, latent semantic analysis, partial least squares, principal component analysis, multifactor dimensionality reduction, nonlinear dimensionality reduction, multilinear principal component analysis, or any other appropriate dimensionality reduction technique.

Entity extraction module 434 may be configured to identify and classify key elements in the user-defined issue description from text into one or more pre-defined categories. For example, entity extraction module 434 may be configured to locate and classify named entities mentioned in the user-provided issue description into pre-defined categories such as person names, device names, network names, organizations, locations, time expressions, quantities, monetary values, percentages, or any other category of entities. In some embodiments, entity extraction module 434 may utilize extraction rules that may be based one or more extraction techniques, such as pattern matching, linguistics, syntax, and/or semantics.

Classifier module 436 may be configured to determine, based on the processed user-defined issue description, a specific issue, a classification of the specific issue, and/or any other characteristics corresponding the user-defined issue description. In general, NLP assessment sub-system and/or components thereof may be configured to transform the user-defined issue description into structured, computer-readable data and assess the transformed data using data models and/or machine learning algorithms (e.g., support vector machines, Bayesian networks, maximum entropy, conditional random field, random forest, gradient boosting, neural networks, etc.) that are trained by NLP assessment training sub-system 440.

In some embodiments, NLP assessment training subsystem 440 may include data cleaning module 442 and model training module 444. NLP assessment training subsystem 440 may be configured to receive data from activity logging module 416, such as information exchanged through interface module 412. Data cleaning module 442 may be configured to filter the data received from activity logging module 416 and remove noise (e.g., hashtags, punctuation, numbers, etc.) that may enable model training module 444 to more easily detect patterns in the data. After the data is filtered by data cleaning module 442, model training module 444 may be configured to process the data received from activity logging module 416 to generate data models and/or train one or more machine learning algorithms (e.g., support vector machines, Bayesian networks, maximum entropy, conditional random field, random forest, gradient boosting, neural networks, linear classifiers, etc.) related to the NLP capabilities of ITA 116, The NLP data models generated by NLP assessment training sub-system 440 may be utilized by NLP assessment sub-system 430 to evaluate user-defined issue descriptions in order to provide interface module 412 with an assessment of the issue description.

Figure 5:
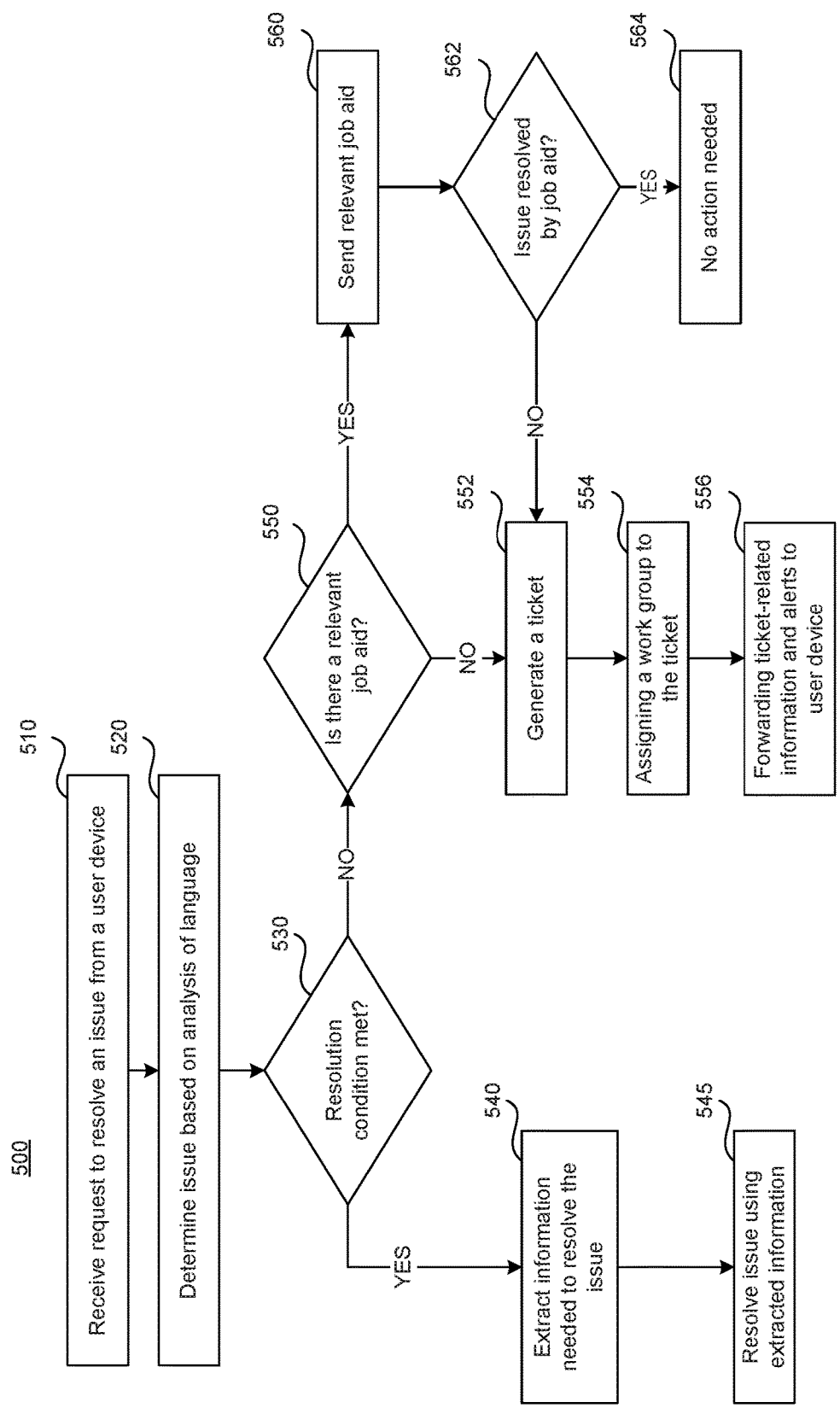
FIG. 5 is a flow diagram of an exemplary process for intelligent ticket management and resolution, consistent with embodiments of this disclosure.

FIG. 5 is a flow diagram of exemplary process 500 for intelligent ticket management and resolution, consistent with some embodiments of this disclosure. In some embodiments, process 500 may be executed by one or more processors (e.g., processor 110) associated with system 200, and/or executed either partially or wholly by the one or more components of system 200 (e.g., UI controller system 114, ITA 116, real-time dialog controller sub-system 310, NLP assessment sub-system 430, classifier module 436, etc.). For ease of discussion, process 500 will be described as being executed by UI controller system 114 and/or ITA 116, although it is to be understood that process 500 may be executed by any suitable component or sub-component of system 200, consistent with the present disclosure.

In some embodiments, process 500 may begin at step 510. At step 510, ITA 116 may receive, from at least one user device, a request to resolve an issue. For example, through chatbot UI 210 or digital collaboration app UI 220, user device 201 may send a request to UI controller system 114, which may forward the request to ITA 116 for assessment. In some embodiments, the request may include language to be analyzed by ITA 116. The language contained in the request is not limited to a single form of communication. For example, the language contained the request may be in the form of free form text, spoken language, or any other appropriate communication medium. In some embodiments, UI controller system 114 may be configured to instantiate a digital dialogue session (e.g., a chatbot session) with user device 201. The digital dialogue session may be used to facilitate communication between user device 201 and UI controller system 114. For example, the request to resolve an issue may be sent to UI controller system 114 through the digital dialogue session, and UI controller system 114 return responses and prompts to user device 201 through the digital dialogue session.

At step 520, ITA 116 may analyze, via natural language processing ("NLP"), the language in the request to determine the issue to be resolved. For example, ITA 116 may be programmed or otherwise configured to perform tasks such as speech and/or text recognition, natural language understanding, and natural language generation. For example, in some embodiments, ITA 116 may feed the request to at least one machine-learning algorithm. These tasks may be carried out through the use of one or more machine-learning algorithms that use historical ticket data to analyze the language and return an assessment of the language to ITA 116. In some embodiments, the at least one machine-learning algorithm may be implemented using statistical methods, machine learning, or neural networks. For example, in some embodiments, the machine-learning algorithm may include at least one of a generalized least squares regression technique, an ordinary least squares regression technique, a tree technique (random forest, decision tree, etc.), a gradient boosting technique, a neural network technique, a support vector machine technique, or a linear classifier technique.

In some embodiments, ITA system 116 may train the at least one machine learning algorithm using the historical ticket data. The historical data may include previously received requests, user-provided issue descriptions in previous requests, previously assigned work groups for each previously received requests, recorded resolution times for each previously received requests, documentation associated (i.e., job aids) with at least one of a product, service, or application associated with the previously received requests, or any other information exchanged between users and UI controller system 114 associated with previous tickets. For example, NLP assessment training sub-system 440 (i.e., data cleaning module 442 and model training module 444) may train the at least one machine learning algorithm using information received from activity logging module 416 in order to improve the ability of NLP assessment sub-system 430 (i.e., feature extraction module 432, entity extraction module 434, and classifier module 436) to make accurate assessments based on the user-defined issue descriptions contained in the requests.

ITA 116 may identify the particular issue described by the user based on the analysis completed at step 520. For example, ITA 116 may determine that user device 201 is experiencing a particular problem (e.g., an issue accessing content in an application associated with a service provider) based on the description provided. At step 530, ITA 116 may determine whether the particular issue identified meets a condition for automated resolution. In some embodiments, the condition may be satisfied if ITA 116 is able to determine that the particular issue may be immediately resolved. ITA 116 may make this determination, for example, by consulting a record stored in at least one database (e.g., database 140) of pre-defined issues and associated solutions, or it may be included in the assessment generated by the at least one machine-learning algorithm implemented by NLP assessment sub-system 430. If the condition is met, process 500 may proceed to step 540. If the condition is not met, process 500 may proceed to step 550.

At step 530, ITA 116 may determine whether additional information is needed to resolve the issue. For example, in step 530, ITA 116 may determine that system 200 may immediately resolve the user's inability to access content in a web-based application associated with the service provider if additional information (e.g., account information, technical specifications of the at least one user device, network information, etc.) is acquired. If additional information is needed, process 500 may proceed to step 540. At step 540, ITA 116 may extract information from user device 201 through one or more communication channels, such as chatbot UI 210 or digital collaboration app UI 220. For example, if ITA 116 determines that an email address is required to resolve the issue, ITA 116 may generate an automated response or prompt requesting the email address and transmit the response or prompt to user device 201 through a digital dialogue session facilitated by chatbot UI 210. After receiving the automated response or prompt from ITA 116, user device 201 may return the required information to ITA 116 through chatbot UI 210. If ITA 116 determines that no additional information is needed at step 530, process 500 may proceed directly to step 545 from step 530.

Once ITA 116 receives all of the information necessary to resolve, the issue, ITA 116 may resolve the issue at step 545. For example, ITA 116 may send user instructions to user device 201 that a user may follow to immediate resolve the issue. In some embodiments, ITA 116 may transmit instructions to user device 201 that cause user device 201 to execute operations that resolve the issue. The issue may thus be resolved immediately without opening a ticket, therefore eliminating the need for assigning a work group and reducing the amount of resources used on facilitating communication between user device 201 and the work group. For example, an administrative, user with authority to reset a user's application passwords within some particular system of record may by means of interaction with chatbot U 210 cause a user's password to be reset by means of interaction between dialog module 312 and that system of record, and thereby obviate the need to create a ticket. As a further example, and by means of similar systemic interaction, an authorized user may cause a system of record to be updated enabling a particular feature or function of that application to be made available to users of that system.

If ITA 116 determines at step 530 that the condition for resolution is not met, process 500 may proceed to step 550. At step 550, ITA 116 may be configured to determine whether a job aid associated with the issue exists. For example, ITA 116 may consult at least one database (e.g., database 140) associated with system 200 to determine if a manual, FAQ, or other documentation associated with the issue identified at step 520 exists. In some embodiments, ITA 116 may consult the at least one database by conducting a search for one or more keyword-derived features associated with the identified issue or included in the user-provided issue description. For example, ITA 116 may retrieve all job aids relating to or containing the keyword "network" if user device 201 is experiencing network related issues. In some embodiments, ITA 116 can narrow search results by additional keyword-derived features contained in the user-provided issue description, such as "slow", "wireless", or other issue-related descriptors. The at least one database may also include a record of job aid associated with particular issues, and ITA 116 may determine that a job aid exists for the issue identified in step 520 based on the record. If the job aid exists UI controller system 114 may retrieve the job aid, for example, from interface module 422 of job aid management sub-system 420.

By way of example, job aid identification may include one or more outputs from the assessment performed by ITA 116 of the user-provided issue description provided by interaction with dialog resolution module 314. In some embodiments, this process may include a priori natural language processing of job aid content to create vectorized representation of the content. Similar NLP vectorization of user-provided issue description may be performed when a user expresses an issue by interacting with chatbot UI 210. By evaluating the latter against similar values in the set of all job aids, the system may recommend an appropriate job aid based on a quantitative assessment of the vectorized representations and an arbitrary threshold.

If ITA 116 determines that a relevant job aid exists at step 550, process 500 may proceed to step 560. At step 560, ITA 116 may send the relevant job aid to the at least one user device user at step 560 (e.g., through chatbot UI 210, digital collaboration app UI 220, and/or ticketing system UI 230). At step 562, ITA 116 may determine whether the sent job aid resolved or helped resolved the issue. For example, ITA 116 may send an alert or notification to the at least one user device prompting the user to indicate whether the issue has been resolved. ITA 116 may then receive a response from the at least one user device and determine, based on the response, whether the issue has been resolved. If the issue has been resolved, process 500 may conclude at step 564. At step 564, ITA 116 may determine that no further action is need. In some embodiments, ITA 116 may be configured to terminate any existing communication channels with the at least one user device, and/or may cause on or more systems and/or subsystems in system 200 to terminate any processes related to the issue.

If ITA determines that a relevant job aid does not exist at step 550, or if the issue was not resolved by the job aid at step 562, process 500 may proceed to step 552. At step 552, ITA 116 may generate a ticket associated with the issue. In some embodiments, ITA 116 may insert the ticket into a record of tickets stored in at least one database associated with system 200 (e.g., database 240). ITA 116 may also send the ticket to ticketing system 240, which may be configured to monitor the status of the ticket and update ticket information based on information received from ticketing system UI 230, UI controller system 114, or ITA 116. In some embodiments, the generated ticket may include an identifier associated with user device 201, information associated with the issue to be resolve (e.g., the particular identified issue, user-provided issue descriptions, etc.), an estimated resolution time, or any other form of information relating to the ticket that may be provided by user device 201 or generated by ITA 116.

At step 554, ITA 116 may assign a work group to the ticket. A work group may be one or more workers associated with a service provider associated with system 200 that are tasked with aiding customers (e.g., a user associated with user device 201) with a particular issue or grouping of issues. For example, there may be one or more work groups associated with system 200 that are assigned to help resolve technical issues, and there may be one or more separate work groups that are assigned to help resolve logistical issues. In some embodiments, the work group may be at least partially based on the assessment of the issue and/or the analysis completed by ITA 116 at step 520. For example, ITA 116 may determine that user device 201 is experiencing a particular issue and may assign the ticket to a work group tasked with resolving that particular issue. For example, ITA 116 may identify that a customer is experiencing connectivity issues based on a description including "can't connect to the internet" and may assign the ticket to a work group associated with network issues. In some embodiments, the assignment may also be based on the availability of one or more work groups. For example, ITA 116 may be configured to consult a record stored in a database (e.g., database 140) indicating the availability and/or workload of work group and to bias the assignment of tickets to work groups with more availability. In some embodiments, UI controller system 114 may establish a communication link between the at least one user and the assigned work group. For example, UI controller system 114 and/or digital collaboration app UI 220 may open a communication channel through a digital collaboration application (e.g., Slack, Microsoft Teams, Google Drive, etc.) that allows user device 201 to communicate and exchange information with the assigned work group.

At step 556, UI controller system 114 may forward ticket-related information to at least one user device associated with user device 201 (e.g., through chatbot UI 210, digital collaboration app UI 220, and/or ticketing system UI 230). Ticket-related information may include, for example, the job aid retrieved at step 550, received communications from the work group, an estimated amount of time to resolution that is estimated by ITA 116, or any other information associated with the ticket generated at step 550. UI controller system 114 may be configured to forward the ticket-related information on a continuing basis, for example, at predetermined time intervals or upon receiving a request from user device 201 to provide a status update.

Disclosed embodiments may include a non-transitory computer-readable medium that stores instructions for a processor (e.g., processor 110) for autonomous testing of a computer application in accordance with the example flowchart of FIG. 5 above, consistent with embodiments in the present disclosure. For example, the instructions stored in the non-transitory computer-readable medium may be executed by the processor for performing process 500 in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for efficient ticket resolution comprising:
   a memory storing instructions; and
   at least one processor configured to execute the instructions to perform operations comprising:
      receiving, from at least one user device, a request to resolve an issue, the request comprising language;
      capturing, using an activity logging module of a ticket management server, user activity occurring at the at least one user device;
      analyzing, using the ticket management server, the language in the request to determine the issue to be resolved by performing natural language processing on the language wherein performing the natural language processing comprises utilizing at least one machine learning algorithm, wherein the at least one machine learning algorithm is trained to generate an assessment based on the language and based on the user activity;
      based on the natural language processing, determining whether the issue meets a condition for automated resolution;
      if the condition is met:
         extracting, via an application programming interface and from the at least one user device, information needed to resolve the issue; and
         resolving, using the ticket management server, the issue using the extracted information; and
      if the condition is not met:
         inserting, into at least one database, a ticket comprising:
            an identifier associated with the at least one user device; and
            information associated with the issue to be resolved;
         assigning, using the ticket management server and based on the information associated with the issue to be resolved, a work group to the ticket;
         consulting, using the ticket management server, the at least one database to determine whether a job aid associated with the issue exists; and forwarding, to the at least one user device, at least one of:
the job aid;
received communications from the work group; and
an estimated amount of time to resolution based on the information associated with the issue to be resolved.

2. The system of claim 1, wherein the user activity comprises user choices relative to suitability of the job aid.

3. The system of claim 2, wherein assigning the work group to the ticket is based on the assessment.

4. The system of claim 2, wherein the operations further comprise training the machine-learning algorithm using historical data comprising:
previously received requests, each request comprising user-provided issue descriptions;
a previously assigned work group for each previously received request;
a recorded resolution time for each previously received request; and
documentation associated with at least one of a product, service, or application.

5. The system of claim 2, wherein the machine learning algorithm comprises at least one of a generalized least squares regression technique, an ordinary least squares regression technique, a random forest regression technique, a gradient boosting regression technique, or a support vector machine regression technique.

6. The system of claim 1, wherein the at least one processor is further configured to establish a communication link between the at least one user device and the work group, the communication link comprising a digital collaboration application.

7. The system of claim 1, wherein the language in the request comprises free form text.

8. The system of claim 1, wherein the language in the request comprises spoken language.

9. The system of claim 1, wherein analyzing the language in the request comprises instantiating a digital dialogue session with the at least one user device.

10. The system of claim 9, wherein extracting the information needed to resolve the issue comprises receiving the information needed to resolve the issue from the at least one user device through the digital dialogue session.

11. A computer-implemented method for efficient ticket resolution comprising:
receiving, from at least one user device, a request to resolve an issue, the request comprising language;
capturing, using an activity logging module of a ticket management server, user activity occurring at the at least one user device;
analyzing, using the ticket management server, the language in the request to determine the issue to be resolved by performing natural language processing on the language wherein performing the natural language processing comprises utilizing at least one machine learning algorithm, wherein the at least one machine learning algorithm is trained to generate an assessment based on the language and based on the user activity;
based on the natural language processing, determining whether the issue meets a condition for automated resolution;
if the condition is met:
extracting, via an application programming interface and from the at least one user device, information needed to resolve the issue; and
resolving, using the ticket management server, the issue using the extracted information; and
if the condition is not met:
inserting, into at least one database, a ticket comprising:
an identifier associated with the at least one user device; and
information associated with the issue to be resolved;
assigning, using the ticket management server and based on the information associated with the issue to be resolved, a work group to the ticket;
consulting, using the ticket management server, the at least one database to determine whether a job aid associated with the issue exists; and
forwarding, to the at least one user device, at least one of:
the job aid;
received communications from the work group; and
an estimated amount of time to resolution based on the information associated with the issued to be resolved.

12. The method of claim 11, wherein the user activity comprises user choices relative to suitability of the job aid.

13. The method of claim 12, wherein assigning the work group to the ticket is based on the assessment.

14. The method of claim 12, further comprising training the machine-learning algorithm using historical data comprising:
previously received requests, each request comprising user-provided issue descriptions;
a previously assigned work group for each previously received request;
a recorded resolution time for each previously received request; and
documentation associated with at least one of a product, service, or application.

15. The method of claim 12, wherein the machine learning algorithm comprises at least one of a generalized least squares regression technique, an ordinary least squares regression technique, a random forest regression technique, a gradient boosting regression technique, or a support vector machine regression technique.

16. The method of claim 11, wherein the at least one processor is further configured to establish a communication link between the at least one user device and the work group, the communication link comprising a digital collaboration application.

17. The method of claim 11, wherein the language in the request comprises free form text.

18. The method of claim 11, wherein the language in the request comprises spoken language.

19. The method of claim 11, wherein analyzing the language in the request comprises instantiating a digital dialogue session with the at least one user device.

20. The method of claim 19, wherein extracting the information needed to resolve the issue comprises receiving the information needed to resolve the issue from the at least one user device through the digital dialogue session.

* * * * *

UNITED STATES PATENT AND TRADEMARK OFFICE
CERTIFICATE OF CORRECTION

| | | |
|---|---|---|
| PATENT NO. | : 11,727,331 B2 | Page 1 of 1 |
| APPLICATION NO. | : 17/140812 | |
| DATED | : August 15, 2023 | |
| INVENTOR(S) | : Joel E. Dake et al. | |

It is certified that error appears in the above-identified patent and that said Letters Patent is hereby corrected as shown below:

In the Claims

In Claim 11, Column 16, Lines 24-25, "with the issued to be resolved." should read --with the issue to be resolved.--.

Signed and Sealed this
Thirtieth Day of January, 2024

*Katherine Kelly Vidal*

Katherine Kelly Vidal
*Director of the United States Patent and Trademark Office*